(No Model.)
J. B. EDSON.
REDUCTION OF ZYLONITE AND OTHER PLASTIC COMPOSITIONS TO FORM SHEETS.
No. 349,987. Patented Sept. 28, 1886.
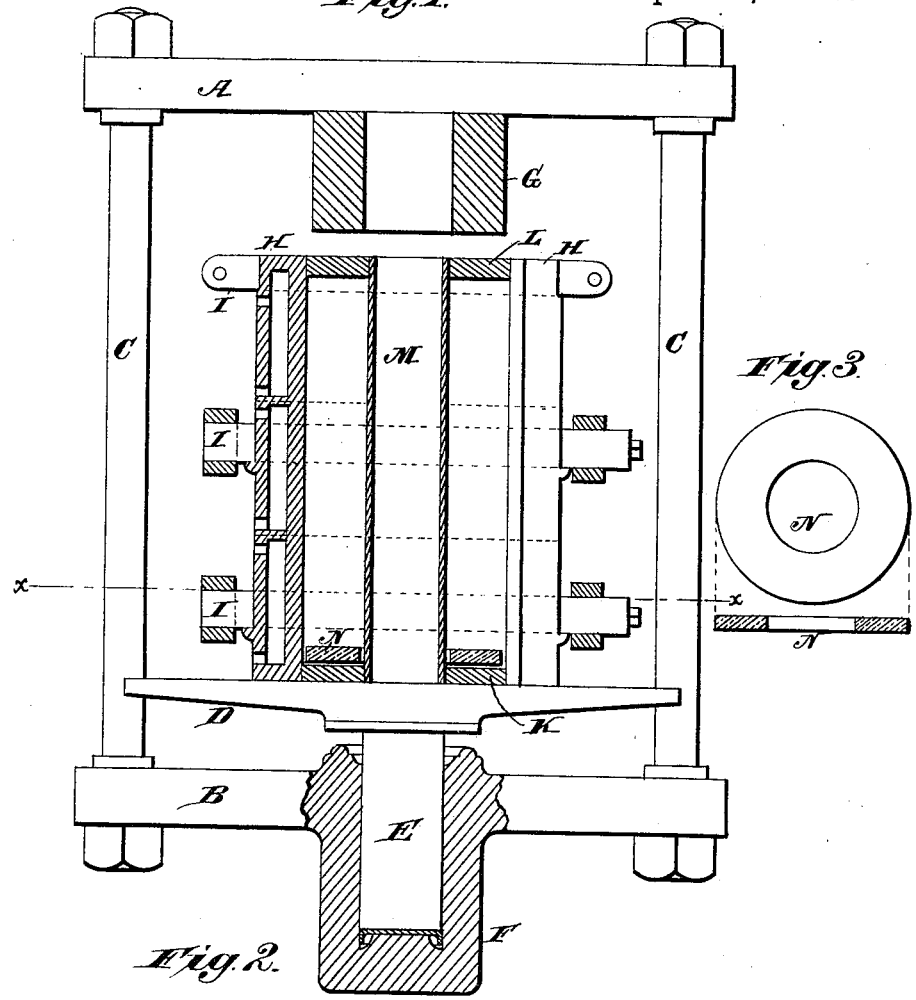
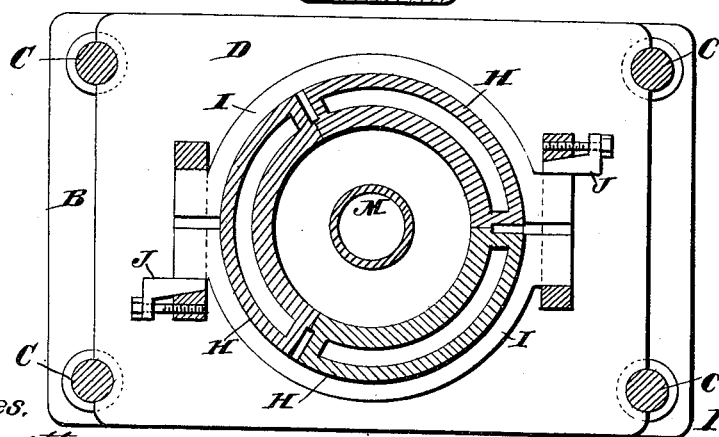
Witnesses.
Robert Everett,
Dennis Bumby.
Inventor.
Jarvis B. Edson.
By James L. Norris,
Atty.
N. PETERS, Photo-Lithographer, Washington, D. C.

UNITED STATES PATENT OFFICE.

JARVIS B. EDSON, OF BROOKLYN, ASSIGNOR TO THE AMERICAN ZYLONITE COMPANY, OF NEW YORK, N. Y.

REDUCTION OF ZYLONITE AND OTHER PLASTIC COMPOSITIONS TO FORM SHEETS.

SPECIFICATION forming part of Letters Patent No. 349,987, dated September 28, 1886.

Application filed January 30, 1886. Serial No. 190,355. (No model.)

*To all whom it may concern:*

Be it known that I, JARVIS B. EDSON, a citizen of the United States, residing at Brooklyn, in the county of Kings and State of New York, have invented new and useful Improvements in Reduction of Zylonite and other Plastic Compositions to Form Sheets, of which the following is a specification.

The invention has for its object the amassing of a quantity of plastic material, subsequent to its treatment and manufacture in the mixing and converting machinery, by heat and pressure upon a mandrel, preferably made of metal, so as to form a solid homogeneous mass free from porosity and flaws, to the end that such plastic mass may be placed in suitable machinery and caused to revolve upon its axis in the presence of a cutting edge or knife so arranged that upon being presented to the mass a continuous sheet will be produced, as has long been the result of cutting rubber sheeting from a mass of the same mounted upon a mandrel, and in cutting blocks of wood revolving round their axes circumferentially in a long thin sheet. Various methods have been proposed for the accomplishment of this object, and some have been experimented with; but no means, so far as I am aware, have been devised suitable for operating with a plastic material of a pyroxyline nature in large quantities—say of two hundred pounds and upward—that is to say, a workman may take in his hands a few pounds of zylonite or suitable substance—say from thirty to fifty pounds—as it emerges from the rolls in sheet form, and while it is yet warm and pliable manage to wrap it on a mandrel, so that when both together are placed in the mold and submitted to heat and pressure and subsequent cooling comparatively satisfactory results are attained; but such has been quite impossible of accomplishment with the much larger quantities now frequently demanded. In the manufacture of a compound fabric for collars and cuffs composed of zylonite cemented to a backing of paper or textile material the zylonite must be made in long lengths, say a yard or more in width, and as much as two hundred pounds of zylonite is regularly required to be placed upon the mandrel at a time, in order that the continuity of the subsequent operation of combining it with some other fabric in sheet form may be disturbed as little as possible. It is obvious that for this purpose mechanical agents must take the place of manual labor, and therefore to provide means whereby the whole operation may be accomplished mechanically constitutes the chief feature of this invention.

In the accompanying drawings, Figure 1 is a sectional elevation of the apparatus for amassing the material on the mandrel; Fig. 2, a transverse sectional view taken on the line $x\,x$ of Fig. 1; and Fig. 3, detail views of zylonite rings, hereinafter referred to.

In the drawings, the letter A indicates the upper head of a press; B, the lower head or base, comprising a hydraulic cylinder, F; and C C C C, four rods or posts connecting the heads; E, a ram in the hydraulic cylinder F, which supports the platen D.

H H H indicate three segmental cored pieces, which form, when in position, a complete cylinder. These three plates are held in position under strong compression by the straps I I I, a tension being brought to bear upon all of these circular plates, in order to perfectly close the joint between them (so as to prevent the escape of any material) by the wedge and locking device shown on each at J J.

K indicates a washer lying loosely at the bottom of the cylinder and upon the platen of the hydraulic press.

L indicates another metallic washer or follower fitting nicely into the cylinder formed by the three segmental plates, and the use of which will hereinafter appear.

M indicates a mandrel, either made of solid metal or cored, and having bearings at each end, as desired.

N indicates a disk of zylonite or other pyroxyline material, having its outer diameter made to correspond with the internal diameter of the cylinder. The central orifice in this zylonite disk is of the diameter of the external surface of the mandrel M.

The apparatus being erected and in position, as shown in the drawings, the upper washer, L, is removed to allow the introduction of the zylonite or other plastic material into the annular space existing between the mandrel and the interior of the cylinder or mold. The method of filling the same may be varied, care being taken to have the zylonite or other material to be molded into a mass of an advantageous form to fill the cylinder closely and leave the minimum amount of blank or air space. The method which I prefer is as follows: I provide a cutting-press capable of punching one or more disks or rings, N, at one operation, and when the material to be molded and consolidated is ready to emerge from the mixing or compounding rolls I run it out in the form of slabs from one-fourth of an inch to one inch in thickness. By passing such slabs through the cutting-press or punching-machine I obtain a number of circular disks or washers, as shown in the drawings in plan and elevation at N. As rapidly as these disks are produced they are dropped down into the annular space of the cylinder and rammed home, so as to expel as much air as possible, and when the cylinder has been filled to the desired amount with these disks or rings the washer L is inserted on top of them, and the operation of applying heat and pressure is in order.

Another method of preparing the zylonite slabs as the material issues from the mixing or compounding rolls is to reduce it to uniform width and thickness and in convenient lengths, and then take the strips and wind them while they are yet warm and flexible around the exterior of a metal sleeve or tubing until the desired amount has been accumulated thereon. The exterior diameter of this temporary mandrel will be just a trifle larger than the mandrel upon which the mass is to be consolidated. The determination of the total quantity to be wrapped about the temporary mandrel will depend upon and be governed by the interior diameter of the amassing-cylinder in which the molding operation is to take place. The width of the strips to be run out of the rolls may vary and may be about ten to twenty inches, the essential feature being that they are of such dimensions as to be readily manipulated by hand, and that they be of uniform width, so that their edges when wound upon the temporary sleeve or mandrel will nicely coincide with each other. The object of putting these strips upon the temporary mandrel is to place the material into a compact and solid form of predetermined dimensions, so that when it is subsequently introduced into the cylinder of the mold as much air as possible will be displaced. After these sleeves, with their contained material, have remained sufficiently long to allow the zylonite accumulated thereon to cool, the zylonite is removed therefrom, which can be readily done, and the accumulated rings, or "spirals," as they may be called, are inserted into the cylinder of the mold, the same as in the process of introducing the circular disks or rings of zylonite previously mentioned.

Other methods will be suggested to the workman; but it is obvious that the distinguishing feature of all of them is to so prepare the zylonite as it leaves the rolls that it shall possess sufficient uniformity and approximation to the dimensions of the annular space to be filled that the utmost amount of the space will be occupied thereby and the air consequently expelled, thus avoiding in a large measure the danger of air being present and mingling with the molded mass, which would produce porous results. The sections which when put together form a solid cylinder or mold are cored out or jacketed for the purpose of receiving a heating and a cooling agent, and these jackets are provided with the usual pipes and valves and inlets and outlets suitable for the purpose.

If the cylinder is composed of three sections bolted together, each of these sections is preferably provided with jackets or cored chambers, so that each section is independent of the others. When such construction is employed, it of course becomes necessary that the amount of heating agent shall be uniformly applied to each of the sections; otherwise one side of the plastic contents might receive more or less heat than the other. Where it is desired to avoid the possibility of this difficulty, the three separate portions of the cylinder are placed together with nicely-made joints, either with or without the aid of packing material, and in such cases apertures are made in the edges of the segmental plates opposite to each other in such a manner that the heating agent may circulate from one section to another entirely around the circumference of the mold, and thus save two-thirds of the fittings and attachments otherwise necessary.

I have found it well in practice to divide each of the sections comprising the cylinder horizontally, so as to make three series of jackets, one above the other, as indicated by dotted lines in Fig. 1. In this construction it is possible to apply the heating and cooling agent to one portion of the contents in different degrees from that of another portion, or to begin the heating and molding operation at the lower end first, following with the second or middle apartment, and finish with the upper or last one; but this is not absolutely essential. By following up the pressure as the material has become softened under the action of the heating agent all of the disks or rings of plastic material which were placed in the cylinder become consolidated into a solid mass and affixed to the mandrel M. The pressure for compressing them together will be from five hundred to one thousand pounds per square inch on the surface of the material operated upon by the annular plunger G; but more pressure may be used with advantage.

When the air has been expelled and the material kept sufficiently long under the influence of heat and pressure to effect the proper consolidation, then a cooling agent is substituted for the heating agent and the pressure of the ram maintained until all has become cool. Then the dependent piston G is withdrawn by lowering the ram E, and the tightening devices J J are removed, together with the removable clamps I I, and the sections which comprise the cylinder are easily separated from the mass. When, however, with certain qualities of plastic material, difficulty is experienced in removing the three annular sides from the "heat," I insert a thin sheet-metal lining within the cylinder and introduce the zylonite disks or rings. This sheet-metal lining need not be over one thirty-second of an inch in thickness, and when of this dimension it readily conforms to the interior surface of the cylinder. After removing the clamping devices and the three parts forming the sides of the mold the top and bottom metal washers or followers, K and L, are readily removed by the tap of a mallet. The mandrel, after being removed, is placed with its contents in a lathe of suitable dimensions, which has a cutting edge or knife of sufficient length, and which can be uniformly conveyed or advanced toward the axes of the mandrel. When the mandrel is revolved and the knife-edge is steadily advanced, a sheet will be produced depending in thickness upon the speed of the advancement of the knife, the same as cutting sheets of rubber from a mandrel. When the resistance offered to the rotation of the mandrel and the mass thereon by the cutting-edge is very great, as in cutting thick sheets, it becomes necessary to cause the material to be more firmly affixed to the mandrel, so as to prevent its turning within its superposed coating of zylonite. In such cases I resort to any of the well-known methods of accomplishing the same, some of which are as follows: The mandrel may be made flat-sided or polygonal, or it may be corrugated or roughened, or it may have portions of its surface removed and such portions replaced with zylonite or wood, or it may have an exterior jacket of perforated metal, or metal plates may be secured upon the mandrel by dowel-pins or otherwise. It is not necessary, in cutting the sheet from the mandrel, to remove it entirely; but a small portion may be left attached thereto, and in subsequent heats or operations other material will readily become welded thereto. Thus mechanical means is provided capable of producing sheets of great length and width and of suitable thickness, entirely impossible of accomplishment by any apparatus known to me.

I am aware of the existence of English Patent No. 1,908, granted to J. Macmillan Dunlop in 1854, in which the following language is used: "The mounting of the cylinder-blocks upon their axes may be effected in any suitable manner; but a method I take is to place the axes within the mold, and then by pressure, and with or without heat or steam, squeeze the material around them." I therefore do not claim, broadly, the mounting of the material upon its mandrel by heat and pressure within a cylinder-mold; but What I do claim, and desire to secure by Letters Patent, is—

1. In an apparatus for consolidating and affixing a mass of plastic material upon a mandrel for the purpose of sheeting therefrom, and in combination with such mandrel, a cylindrical mold composed of two or more segmental jacketed sections for the reception of heating and cooling agents, all firmly combined and held together by bolts and suitable clamping devices, and capable of being opened for the discharge of the same, substantially as described.

2. In an apparatus for consolidating and affixing a mass of plastic material upon a mandrel for the purpose of sheeting therefrom, and in combination with such mandrel, a cylindrical mold composed of two or more segmental jacketed sections for the reception of heating and cooling agents, and all firmly combined and held together by bolts and suitable clamping devices, and capable of being opened for the discharge of the same, and the removable washer K at the bottom of the cylinder, with or without the annular metal top washer, L, substantially as described.

3. A cylindrical mold composed of two or more sections firmly clamped together and open at both ends, each section cored out to provide for heating or cooling agents along any portion of its length, according to the location of the cored chambers, without heating or cooling simultaneously the remaining portions thereof, substantially as described.

4. A cylindrical mold composed of two or more cored sections, said sections or parts being provided with communicating passages at their edges for the circulation of the heating or cooling medium from one plate into another and entirely around the cylinder, substantially as described.

5. In a molding device, a cylindrical mold divided longitudinally into two or more parts, each part being jacketed for the heating or cooling agent, and said cylinder being provided with a loose head at one end and a loose follower at the other, substantially as described.

6. The process of consolidating a mass of plastic material upon a mandrel, consisting in surrounding said mandrel with previously-prepared forms of said plastic material of predetermined dimensions by heat and pressure, and subsequently cooling, said mandrel being located within a cylinder capable of being opened for the discharge of its contents, the consolidating pressure being applied in the direction of the length of the mandrel, substantially as described.

7. The process of manufacturing sheets of plastic composition, consisting in, first, making the material into predetermined separate forms; second, placing upon a mandrel located within a mold the several separate forms and consolidating them into one entire mass upon said mandrel by heat and pressure; and, third, removing said mandrel and contents and placing the same within a suitable lathe or mechanism and subjecting the same to a cutting-edge, substantially as described.

In testimony whereof I affix my signature in presence of two witnesses.

JARVIS B. EDSON.

Witnesses:
GUSTAV KEHR,
J. T. KRAEUTH.